Patented Sept. 16, 1952

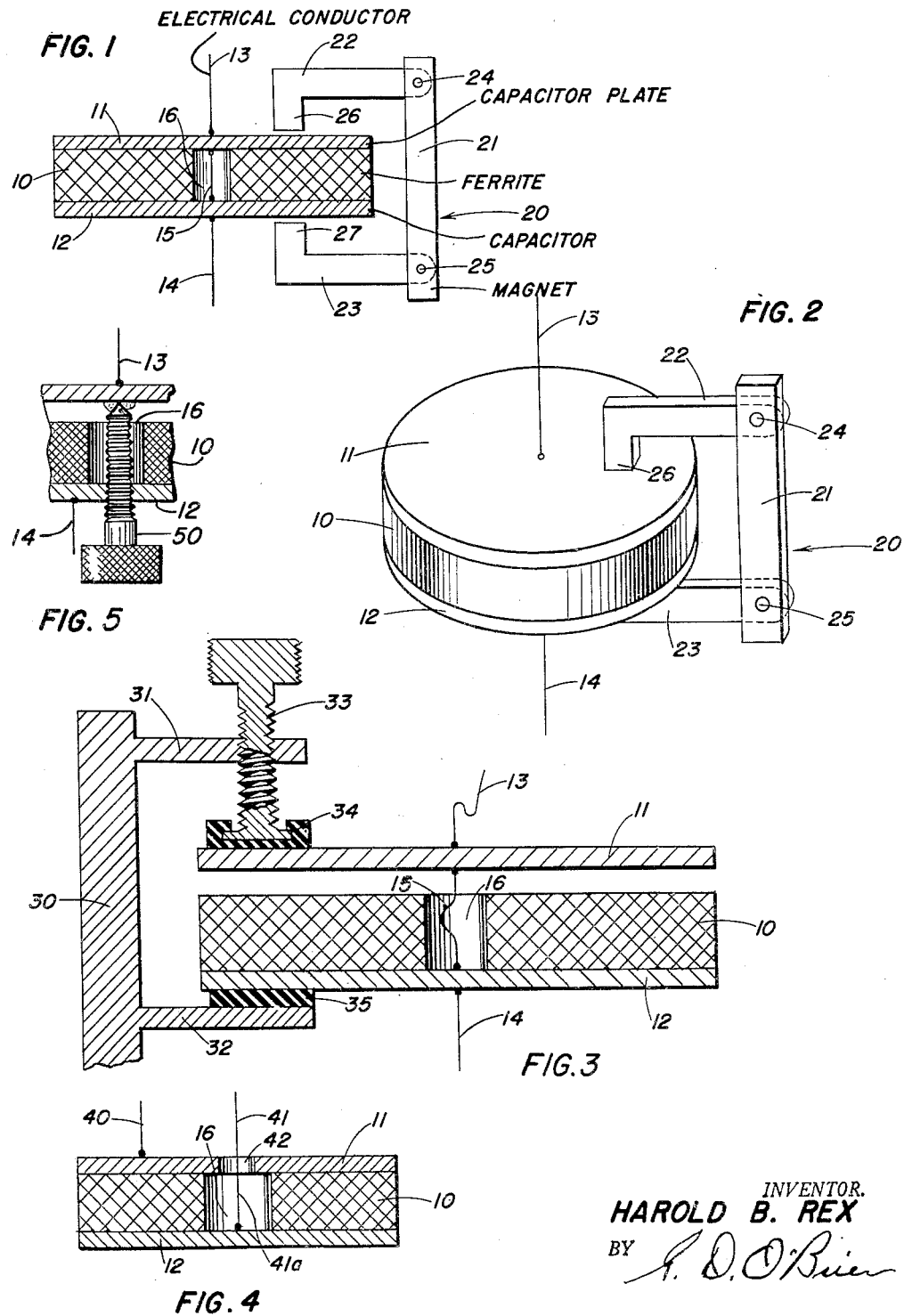

2,611,094

UNITED STATES PATENT OFFICE 2,611,094

INDUCTANCE-CAPACITANCE RESONANCE CIRCUIT

Harold B. Rex, Falls Church, Va.

Application February 16, 1950, Serial No. 144,567

16 Claims. (Cl. 250—40)

1

The present invention relates to resonance circuits and more particularly to a unitary inductance-capacitance resonance circuit.

In general, the present invention contemplates the employment of a material possessing dielectric and high magnetic permeability characteristics. One example of a material possessing this combination of properties is that class of iron oxides commonly referred to as ferrites, a number of such oxides possessing the above-described characteristics being well known in the art. If a disk of such a material as a ferrite is formed with a central opening therethrough to present substantially a toroid, an electrical conductor passed through the central opening of the disk forms a single loop induction coil, while a pair of electrically conducting plates placed on the opposite faces of the disk forms a condenser. In such an arrangement of parts, the ferrite disk acts both as an induction coil core and as a condenser dielectric to enable the formation of a unitary inductance-capacitance circuit. In addition, it is desirable in inductance-capacitance resonance circuits to provide for adjustability of inductive and/or capacitive reactance, so that a tuned resonance circuit may be obtained for various frequencies of impressed current. The present invention contemplates adjustability of these values by varying the degree of magnetic saturation of the induction coil core from an external source of magnetic flux and/or by varying the distance between the condenser plates.

It is, therefore, one object of the present invention to provide an inductance-capacitance resonance circuit wherein the induction coil core also serves as a dielectric for the condenser.

Another object of the present invention is to provide an inductance-capacitance resonance circuit wherein the induction coil core serves also as the dielectric for the condenser and comprises a material possessing high magnetic permeability and dielectric characteristics, such as that class of iron oxides frequently referred to as ferrites.

Another object of the present invention is to provide an inductance-capacitance resonance circuit wherein the induction coil core serves also as a dielectric for the condenser, and wherein the inductive reactance of the induction coil may be varied for any given frequency of impressed current and/or the capacitive reactance may be so varied.

A still further object of the present invention is to provide such an inductance-capacitance resonance circuit as aforementioned wherein the inductive reactance for any given frequency of

2 impressed current may be controlled by varying the degree of magnetic saturation of the induction coil core by an external source of magnetic flux and/or the capacitive reactance for any given frequency of impressed current may be controlled by varying the distance between the condenser plates.

Other objects and advantages of the present invention will be apparent to those skilled in the art from a consideration of the following detailed description thereof, made in conjunction with the accompanying drawings in which like numerals refer to like or corresponding parts, and wherein:

Fig. 1 is a cross-sectional view of one embodiment of the present invention presenting a parallel inductance-capacitance circuit and providing for a variable external source of magnetic flux for controlling the inductive reactance thereof;

Fig. 2 is an isometric view of the embodiment of the present invention shown in Fig. 1;

Fig. 3 is a cross-sectional view of another embodiment of the present invention presenting a parallel inductance-capacitance circuit and providing for control of the capacitive reactance thereof by variations in the space between the condenser plates;

Fig. 4 is a cross-sectional view of another embodiment of the present invention presenting a series inductance-capacitance circuit; and Fig. 5 is a cross-sectional view of an alternative structure for the embodiment of the present invention shown in Fig. 3.

The present invention contemplates the use of a material, such as a ferrite, which possesses both high magnetic permeability and dielectric characteristics, enabling a unitary structure thereof to function simultaneously as an induction coil core and as a condenser dielectric. In the two embodiments illustrated in Figs. 1, 2, and 3, a toroid or similarly shaped disk 10 of such a material is interposed between two electrically conducting condenser plates 11 and 12. An electrically conducting lead 15 passes through the central opening or aperture 16 of the disk 10 and is connected at each of its ends to the two condenser plates 11 and 12, while a pair of input leads 13 and 14 are connected to the opposite faces of each of the condenser plates from the lead 15. Utilizing the principle that the inductance produced by one turn of wire about a core of permeability $n$ is electrically equivalent to a coil of the same cross section wound with $n$ turns of wire, the lead 15 forms a single turn induction coil with the disk 10 functioning as its core. If a ferrite is employed as the material comprising the disk 10, because of the high dielectric constant of such a material, only a very small capacitor is necessary to enable tuned resonance to be obtained in the present circuit. Upon the application of a current to the input leads 13 and 14, current flows between these two leads through the condenser plate connecting lead or induction coil 15, while simultaneously, in electrical parallel relationship to the aforementioned flow of current, condenser current flows between the condenser plates 11 and 12, thus presenting a unitary parallel inductance-capacitance resonance circuit with a single element, the disk 10, functioning both as the induction coil core and as the condenser dielectric.

If desired, the inductive reactance of the induction coil may be varied in order to tune the present resonance circuit for various frequencies of impressed current. Utilizing the principle that the inductive reactance of an induction coil may be controlled by the degree of magnetic saturation of the core of the coil resulting from an external source of magnetic flux, the disk 10 may be saturated to the desired degree by providing either a supplemental coil or an adjustable permanent magnet or the like therefor, to supply the external or control magnetic flux. As an example thereof, Figs. 1 and 2 illustrate an adjustable permanent magnet means for supplying the control flux. As shown in these drawings, a permanent magnet 20, having the pole arms 22 and 23 pivotally connected at points 24 and 25, respectively, to the magnet base 21, is positioned with its pole pieces 26 and 27 across the core 10, causing a control flux to flow from one pole piece through the core to the other pole piece of the magnet. To control the degree of saturation of the core 10 by the magnet 20, the arms 22 and 23 may be pivoted to a position closer to or farther away from the core 10, thus increasing or decreasing the degree of saturation thereof.

Also, the present resonance circuit may be tuned for various frequencies of impressed current by varying the capacitance of the condenser. One suitable way of effecting this end is to vary the distance between the plates 11 and 12. Fig. 3 illustrates one possible embodiment for effecting this control. To this end, a stand 30 provided with the extending arms 31 and 32 supports the capacitance-inductance circuit by its arm 32, connected to the condenser plate 12 through the electrically insulating pad 35, while the other arm 31 carries the adjustment screw 33 affixed to the other condenser plate 11 through an electrically insulating pad 34. Plate 11 is removable from the disk 10, thereby enabling an adjustment of the space between the condenser plates 11 and 12 by adjustment of the screw 33. Since the space between the condenser plates 11 and 12 is variable, the connecting lead 15 therebetween is provided with sufficient slack to enable the desired adjustments. Thus, in the present embodiment, upon the application of current of a given frequency to the input leads 13 and 14, tuning of the circuit may be had by adjusting screw 33 to bring condenser plates 11 and 12 either closer together or farther apart to decrease or increase the capacitive reactance. As an alternative means for adjusting the capacitance of the condenser, the stand 30 and its screw 33 may be replaced by an adjustment screw 50 threaded through the fixed plate 12 and affixed at one end to the adjustable plate 11, as shown in Fig. 5, such that adjustment of the screw relative to plate 12 adjusts the spacing of plate 11 from disk 10 to effect the same results as described above. In such an arrangement, the adjustment screw 50 may replace the connecting lead 15 and in itself form the single turn induction coil.

As would be apparent to one skilled in the art, both of the above-described means for adjusting the reactance components of the present circuit may be employed simultaneously to obtain the desired tuning thereof. Thus, there is provided a unitary structure presenting a parallel inductance-capacitance resonance circuit employing a single element acting simultaneously as an induction coil core and a condenser dielectric, and further, the circuit may be tuned by varying the inductive or capacitive reactance of the circuit, or both.

Although hereinabove described as a parallel inductance-capacitance circuit, the present invention may be modified to present a series inductance-capacitance circuit as illustrated in Fig. 4. In this embodiment, the condenser plate 11 is formed with the substantially central opening or aperture 42 therethrough located coincident with the opening 16 through the disk 10. One input lead 40 is connected to condenser plate 11, while the other input lead 41 is connected to the disk engaging surface of condenser plate 12. The latter lead passes through the openings 16 and 42 and is insulated from the condenser plate 11 in its passage through the plate's opening. Thus, upon the application of a current to the input leads 40 and 41, condenser current flows through the condenser formed by the plates 11 and 12 and dielectric 10, and current also flows through the portion 41a of lead 41, in electrical series with the condenser, which passes through the opening 16 in the disk 10 to function as a single turn induction coil with the disk as its core, thereby presenting a series inductance-capacitance circuit. The present embodiment may be tuned for resonance by varying the inductive and/or the capacitive reactance in the same manner as for the parallel inductance-capacitance circuit.

Modifications of the present invention differing from the specific details of the embodiment hereinabove described, but within the spirit and scope thereof as defined by the appended claims, will be apparent to those skilled in the art.

The invention described herein may be manufactured and used by or for the Government of the United States of America for governmental purposes without the payment of any royalties thereon or therefor.

What is claimed is:

1. A unitary inductance and capacitance circuit comprising a pair of condenser plates, a ferrite disk interposed therebetween, an electrically conducting lead passing through a substantially central opening in said disk, and means for simultaneously applying a current to said condenser plates and said lead, said plates and disk thereby forming a capacitor and said lead forming an induction coil with said disk as its core.

2. A unitary inductance and capacitnace circuit comprising a pair of condenser plates, a dielectric of high magnetic permeability interposed therebetween, an electrical conductor passing through an aperture in said dielectric, and input means for simultaneously applying a current to said condenser plates and said conductor, said plates and dielectric thereby forming a capacitor and said conductor forming an induction coil with said dielectric as its core.

3. A unitary inductance and capacitance circuit comprising a pair of condenser plates, a dielectric of high magnetic permeability interposed therebetween, and an electrical conductor passing through an aperture in said dielectric, said plates and dielectric thereby forming a capacitor and said electrical conductor functioning as an induction coil with said dielectric as its core.

4. A capacitance and inductance circuit comprising a pair of condenser plates, a ferrite disk interposed therebetween, an electrically conducting connecting lead passing through a substantially central opening formed in said disk and affixed to said two condenser plates, and input means for said circuit connected to each of said plates, application of current to said input means causing said condenser plates and disk to function as a capacitor and said lead to function as an induction coil with said disk as its core, thereby providing a parallel capacitance and inductance circuit.

5. A capacitance and inductance circuit comprising a pair of condenser plates, a dielectric interposed therebetween, said dielectric also possessing the characteristic of high permeability to magnetic flux, and an electrical conductor passing through an aperture formed in said dielectric and connecting said two condenser plates, the application of a voltage across said plates causing said condenser plates and dielectric to form a capacitor and said conductor to form an induction coil with said dielectric as its core, thereby providing a parallel capacitance and inductance circuit.

6. An inductance and capacitance circuit comprising a pair of condenser plates, a ferrite disk interposed therebetween, a first of said plates and said disk being formed with substantially central and coincident openings, an electrically conducting lead connected to a second of said condenser plates and passing through said openings to form one current input means, and a second current input means affixed to the first of said condenser plates, said condenser plates and disk functioning as a capacitor and said lead functioning as an induction coil with said disk as its core, thereby presenting a series inductance and capacitance circuit.

7. An inductance and capacitance circuit comprising a pair of condenser plates, a dielectric interposed therebetween possessing the characteristic of high permeability to magnetic flux, a first of said plates and said dielectric being formed with substantially coincident apertures, a lead connected to a second of said condenser plates and passing through said openings to form one current input means, and a second current input means affixed to the first of said condenser plates, said condenser plates and dielectric functioning as a capacitor and said lead functioning as an induction coil with said dielectric as its core, thereby presenting a series inductance and capacitance circuit.

8. An inductance and capacitance circuit comprising a pair of condenser plates, a dielectric interposed therebetween possessing the characteristic of high permeability to magnetic flux, an electrical conductor connected to a first of said condenser plates and passing through an aperture formed in said dielectric, the application of a voltage across a second of said plates and said conductor causing said condenser plates and dielectric to function as a capacitor and said conductor to function as an induction coil with said dielectric as its core, thereby presenting a series inductance and capacitance circuit.

9. A device as set forth in claim 1 having means for applying an independent magnetic flux to the ferrite disk for controlling the inductive reactance of the induction coil.

10. A device as set forth in claim 3 having means for controlling the inductive reactance of the induction coil.

11. A device as set forth in claim 1 having means for varying the space between the condenser plates to control the capacitive reactance of the capacitor.

12. A device as set forth in claim 3 having means for controlling the capacitive reactance of the capacitor.

13. A device as set forth in claim 3 having a means for controlling the inductance and means for controlling the capacitance factors of the circuit.

14. A device as set forth in claim 1 with said lead comprising an electrically conducting means also functioning to adjust the space between the condenser plates to control the capacitive reactance of the capacitor.

15. A device as set forth in claim 3 with said lead comprising an electrically conducting means also functioning to adjust the space between the condenser plates to control the capacitive reactance of the capacitor.

16. A device as set forth in claim 3 having means for controlling the inductance factor of the circuit and said lead comprising an electrically conducting means also functioning to adjust the capacitance factor of the circuit.

HAROLD B. REX.

REFERENCES CITED

The following references are of record in the file of this patent:

UNITED STATES PATENTS

| Number | Name | Date |
| --- | --- | --- |
| 2,457,816 | Grimm | Jan. 4, 1949 |
| 2,509,758 | Brockman | May 30, 1950 |